(12) United States Patent
Tsang et al.

(10) Patent No.: US 7,129,177 B2
(45) Date of Patent: Oct. 31, 2006

(54) WRITE HEAD FABRICATION BY INVERTING ORDER OF PROCESS STEPS

(75) Inventors: Douglas Kei Tak Tsang, San Rafael, CA (US); Jorge D. Colonia, San Jose, CA (US); Yvette Chung Nga Winton, San Francisco, CA (US); Michael Ming Hsiang Yang, Santa Clara, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 74 days.

(21) Appl. No.: 10/976,588

(22) Filed: Oct. 29, 2004

(65) Prior Publication Data

US 2006/0091103 A1   May 4, 2006

(51) Int. Cl.
*H01L 21/311*   (2006.01)

(52) U.S. Cl. .................. 438/703; 29/603.1; 29/603.15; 29/603.16; 216/22; 216/57; 360/313; 360/324; 438/692; 438/697; 438/700

(58) Field of Classification Search ............... 29/603.1; 216/22, 57; 360/313, 324; 438/692, 697
See application file for complete search history.

(56) References Cited

U.S. PATENT DOCUMENTS

| | | | |
|---|---|---|---|
| 4,214,917 A | 7/1980 | Clark et al. .................. 148/1.5 |
| 5,348,617 A | 9/1994 | Braymen .................... 156/644 |
| 5,853,558 A | 12/1998 | Gray et al. .................. 205/119 |
| 6,033,995 A | 3/2000 | Muller ........................ 438/749 |
| 6,127,272 A | 10/2000 | Weitzel et al. .............. 438/694 |
| 6,154,346 A | 11/2000 | Sasaki ......................... 360/317 |
| 6,261,964 B1 | 7/2001 | Wu et al. .................... 438/705 |
| 6,309,975 B1 | 10/2001 | Wu et al. .................... 438/705 |
| 6,369,984 B1 | 4/2002 | Sato ............................ 360/126 |
| 6,452,756 B1 | 9/2002 | Sasaki ......................... 360/317 |
| 6,495,311 B1 | 12/2002 | Khan et al. ................. 430/313 |
| 6,541,346 B1 | 4/2003 | Malik .......................... 438/316 |
| 6,566,276 B1 | 5/2003 | Maloney et al. ............ 438/758 |
| 6,651,312 B1 | 11/2003 | Sasaki ...................... 29/603.12 |
| 6,667,850 B1 | 12/2003 | Khan et al. ................. 360/126 |
| 6,696,352 B1 | 2/2004 | Carr et al. ................... 438/458 |
| 6,696,363 B1 | 2/2004 | Lee et al. .................... 438/681 |
| 2003/0034251 A1 | 2/2003 | Chikarmane et al. ....... 205/125 |
| 2003/0036021 A1 | 2/2003 | Khan et al. ................. 430/313 |
| 2003/0190820 A1 | 10/2003 | Hill et al. ................... 438/785 |
| 2003/0203583 A1 | 10/2003 | Malik .......................... 438/312 |

(Continued)

*Primary Examiner*—Nadine G. Norton
*Assistant Examiner*—Maki Angadi
(74) *Attorney, Agent, or Firm*—Silicon Valley Patent Group LLP; Omkar Suryadevara

(57) ABSTRACT

During fabrication of a write head via holes are first opened in a gap layer, followed by formation of seed layers instead of the other way around. Moreover a first seed layer is formed, and without the first seed layer being used a second seed layer is formed. The second seed layer (which is the topmost layer) is used in plating to form coils (e.g. of copper) for the write head. After coil formation, the first seed layer is used for plating to form vias (e.g. of NiFe). The two seed layers may be formed in a single operation by using two different targets in a vacuum deposition chamber. Moreover, a single insulation layer is sufficient to insulate and protect all plated elements, regardless of whether they are formed by use of the first seed layer or the second seed layer.

14 Claims, 5 Drawing Sheets

U.S. PATENT DOCUMENTS

| | | |
|---|---|---|
| 2003/0214763 A1 | 11/2003 | Childress et al. ........ 360/324.2 |
| 2004/0012090 A1 | 1/2004 | Basol et al. ................ 257/755 |
| 2004/0060166 A1 | 4/2004 | Horung et al. ........... 29/603.08 |
| 2005/0243465 A1* | 11/2005 | Lille et al. .................. 360/126 |

* cited by examiner

WRITE HEAD FABRICATION BY INVERTING ORDER OF PROCESS STEPS

BACKGROUND

A conventional process for manufacturing a magnetic head (for use in mass storage devices such as disk drives and/or tape drives) is illustrated in FIGS. 1A–1H. Specifically, a number of layers (not shown) of a semiconductor wafer are formed in the normal manner, starting with a substrate (not shown) until the three shown in FIG. 1A are formed. Specifically, a first shield layer (not shown) of NiFe (nickel-iron) approximately 2 microns thick is formed over a silicon substrate. This layer is followed a first gap layer and a sensor layer which are both very thin (e.g. 20 nanometers roughly, and <10 nanometers respectively). The first gap layer is typically made of alumina. The sensor is made of layers of combination of metals such as Cu, PtMn, and NiFe. The sensor thickness is about 300 A. Note that the sensor layer forms a read head as discussed below in detail in reference to FIG. 1I.

On top of the sensor layer is a second shield layer formed of NiFe (nickel-iron) approximately 2 microns thick, followed by a second gap layer (e.g. alumina also of 20 nanometers roughly), followed by the three layers shown in FIG. 1A which form a cross-section of a write head along the Y axis. The bottom most layer 101 in FIG. 1A is a NiFe layer which is also 2 microns thick, followed by a gap layer 102 which separates a copper seed layer 103 from the bottom most layer 101. Gap layer 102 is used to insulate two metal layers 101 and 103 from one another, and hence layer 102 is formed of an insulating material (such as alumina) and is sufficiently thick (e.g. 300 nanometers).

After formation of the copper seed layer 103, before formation of the copper layer itself, two photo lithographic steps are performed as follows. A first step is a photolithography and wet chemical etch step which opens row and column boxes and alignment marks for the second step (described later in this paragraph). Note that the row and column boxes and marks are not shown in FIG. 1A because they are in field and dedicated rows which are located far away (in the horizontal direction) from the location of traces and coils (discussed below).

Next, the prior art process defines locations where copper is to be plated. Specifically, copper is plated in regions 104A–104Z (FIG. 1B), but before plating, these regions are covered up with a photoresist (not shown) that is blanket deposited over the entire layer 103 (FIG. 1A), followed by exposure to define regions 104A–104Z. Then, plating is performed to create conductive traces in these regions as shown by coils 105A and trace 105I and coils 105Z in FIG. 1B. Next, a vacuum-based sputter and etch process is performed to remove the copper seed in all regions where copper is not plated, as shown in FIG. 1C. The sputter and etch process is isotropic etch that is performed to remove the seed layer.

Then, a number of via holes (such as via hole 106 in FIG. 1D) are made in the gap layer 102, by first spinning a resist (not shown) on the structure shown in FIG. 1C, followed by exposing the areas to be etched, followed by a chemical wet etch. This process step is followed by removal of the resist (by a resist strip process e.g. using N-methly-pyrrolidone). Next, traces 105A–105Z are protected by formation of a layer 107 of insulation. The insulation layer 107 (not shown) is formed all over the wafer by spinning a resist to fill the space between coils 105A and 105Z, followed by exposure and development. The resist which remains over (and between) coils 105A and 105Z is baked to harden it and make it into permanent insulation 107A and 107B as shown in FIG. 1E. Note that trace 105I forms the write head, and it is left uncovered at this stage, because it needs to be connected later on to a metal via that is yet to be formed.

Next, a full film of nickel iron (NiFe) seed layer 108 is formed all over the wafer as shown in FIG. 1F, followed by spinning a resist which is opened for row and column boxes and alignment marks in the manner described above in reference to FIG. 1A. As noted above, these marks and boxes are in dedicated non-critical areas of the wafer. These marks are used for a photo lithography process similar to FIG. 1C (except that the seed here is NiFe and not Cu). Next step spins a resist followed by openings (not shown) in which are formed vias 109A–109N are by plating NiFe in the openings (at the bottom of which is located seed layer 108). After plating is completed, the seed material in layer 108 that is not located under the vias 109A–109E is removed by sputter/etch process as shown in FIG. 1G. Lastly, an additional insulation layer 110 is formed, of the same material as and in the same manner, as insulation layer 107 (described above). In fact these two layers 107 and 110 are formed of the same insulation material. Thereafter, the wafer is planarized, e.g. by chemical mechanical polishing (CMP) thereby to make it ready for another process.

FIG. 1I illustrates in a perspective view, a magnetic head formed by the process illustrated in FIGS. 1A–1H wherein certain portions form a read head h1 and remaining portions form a write head h2, both heads being laminated on an end surface of a slider 151. Read head h1 includes a lower shielding layer 163 made of a magnetic alloy and formed on the end surface of slider 151, and a magnetoresistive element 165 (also called "sensor" in the previous paragraph) is partially exposed at the medium-facing surface. A small magnetic field from the magnetic recording medium when applied to the magnetoresistive element 165 changes a resistance of magnetoresistive element 165 so that a change in voltage based on the change in resistance is read out as a reproduction signal of the magnetic recording medium. Coil 105 which is a part of the write head is patterned to have a spiral planar shape. The write head also includes an upper core layer 178 that is magnetically connected to lower core layer 167 in a central portion of the coil 105.

For more details on the structure of FIG. 1I, see U.S. Pat. No. 6,369,984, which patent is incorporated by reference herein in its entirety. Also incorporated by reference herein in their entirety are the following three U.S. Pat. Nos. 6,154,346, 6,651,312, and 6,452,756 all by Yoshitaka Sasaki.

Applicants note that one or more process steps of the type illustrated in FIGS. 1A–1H are made redundant and one or more layer thicknesses are reduced when two layers are formed in an order inverse of their usage in accordance with the invention as described next.

SUMMARY

During fabrication of a write head in several embodiments of the invention, several acts are performed in an inverse order as compared to the prior art. For example although via holes in the prior art are formed in a gap layer after plating of coils, in many embodiments of the invention via holes are opened in a gap layer, followed by formation of the seed layer for plating coils.

The just-described reversal of acts allows the two seed layers to also be formed in an inverse order relative to one another in many embodiments of the invention. Specifically, in the prior art described above, each seed layer is formed and used in plating, prior to formation of another seed layer. However, in several embodiments of the invention a first seed layer is formed and without being used a second seed layer is formed. The two seed layers are then used in inverse order of their formation. Specifically, the second seed layer (which is now the topmost layer) is used in plating to form coils (e.g. of copper) for the write head. After coil formation, the first seed layer is used for plating to form vias (e.g. of NiFe).

When the two seed layers are formed in the just-described order, these two seed layers may be created in a single operation by using two different targets in a vacuum deposition chamber. Moreover, when plated elements are formed in the order described in the previous paragraph, a single insulation layer can be used to insulate and protect all plated elements, regardless of whether they are formed by use of the first seed layer or the second seed layer.

DETAILED DESCRIPTION

Figure 1A:
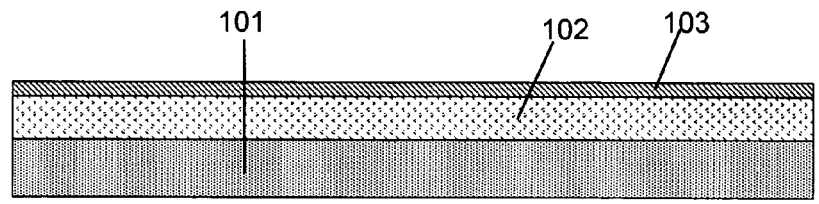
FIGS. 1A–1H illustrates, in cross-sectional views, various steps of the prior art.
Figure 1B:
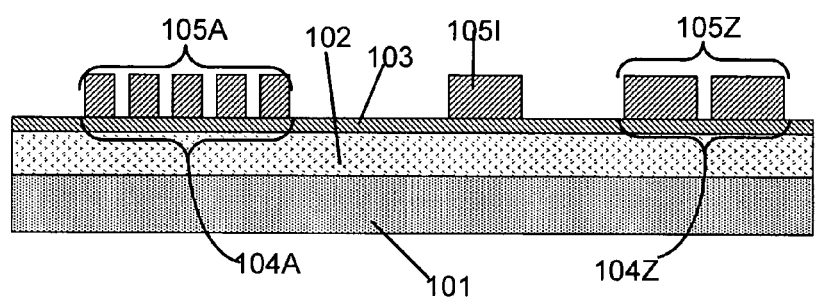
Figure 1C:
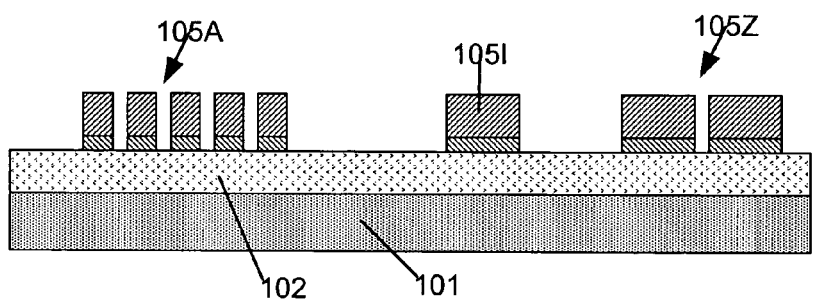
Figure 1D:
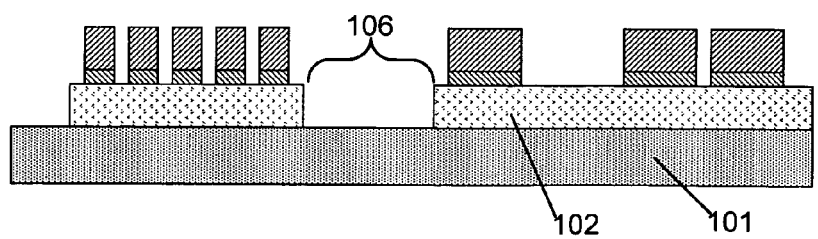
Figure 1E:
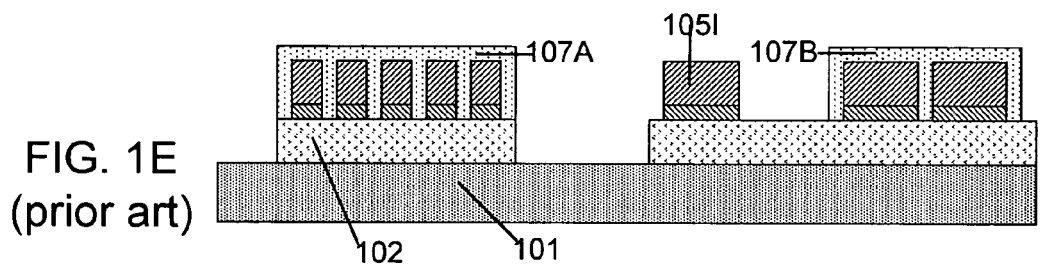
Figure 1F:
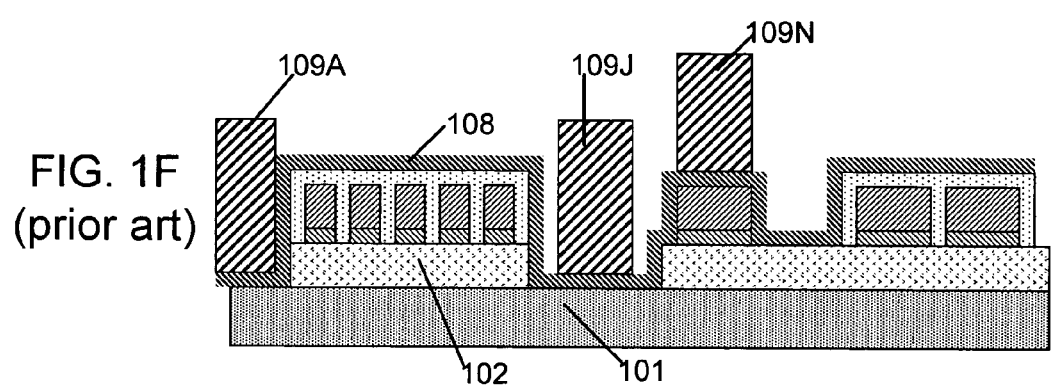
Figure 1G:
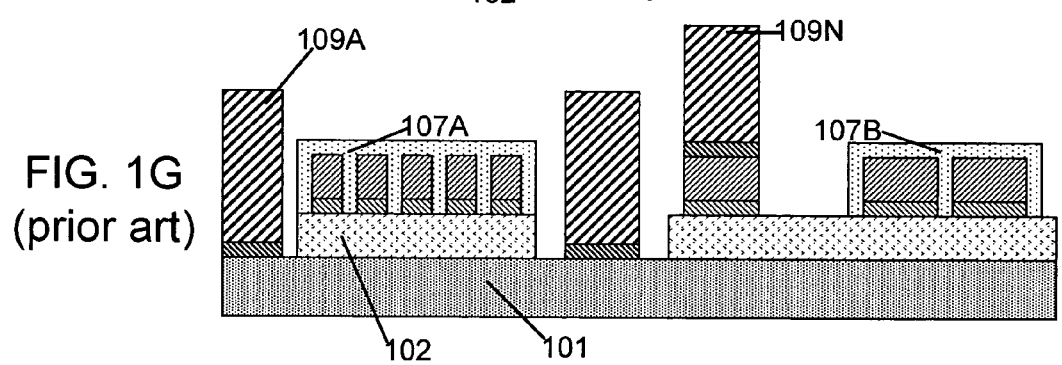
Figure 1H:
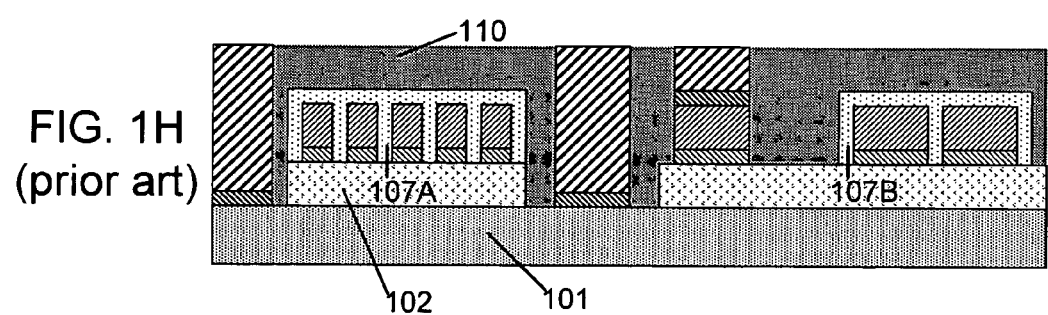
Figure 1I:
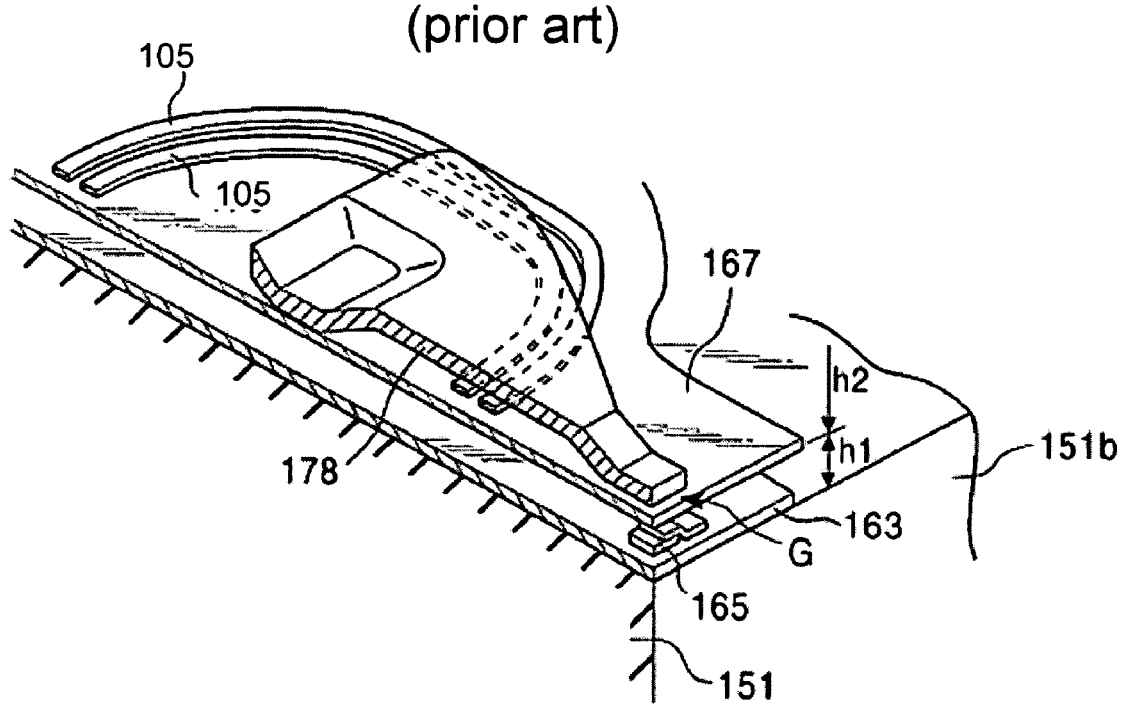
FIG. 1I illustrates, in a perspective view, a magnetic head formed by the process illustrated in FIGS. 1A–1H FIGS. 2A–2G illustrate, in cross-sectional views, acts that are performed in several embodiments of the invention wherein two layers are formed in an order inverse of their usage.
Figure 2A:
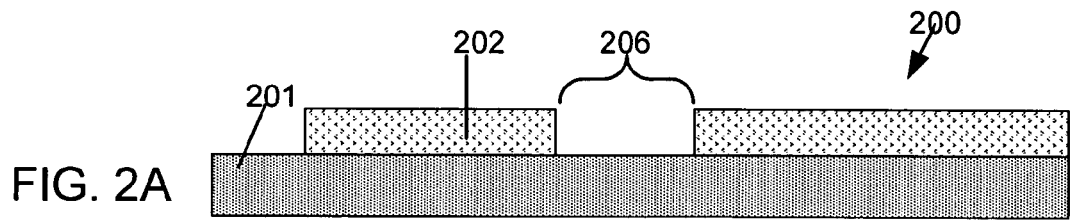
Figure 2B:
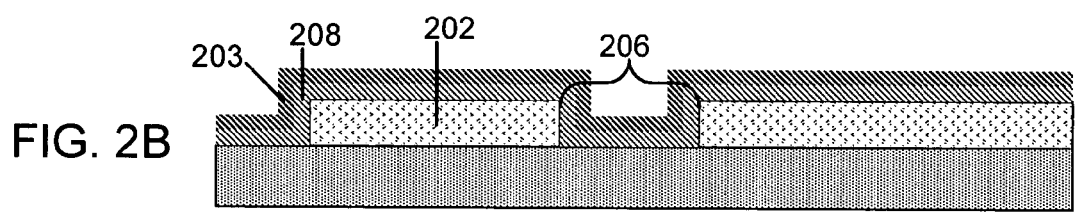
Figure 2C:
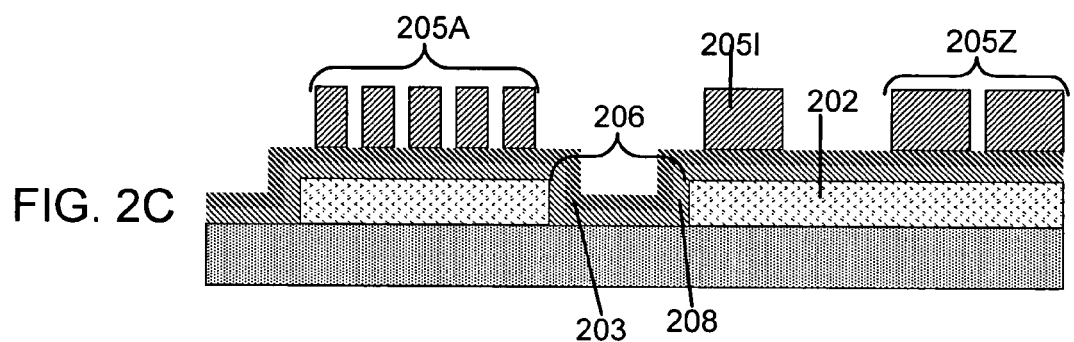
Figure 2D:
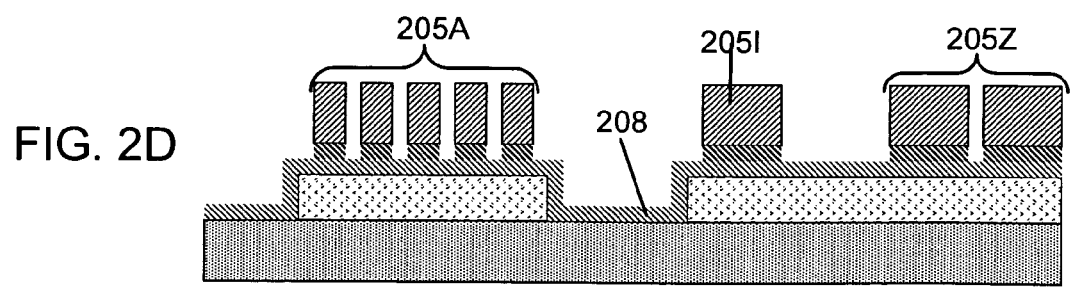
Figure 2E:
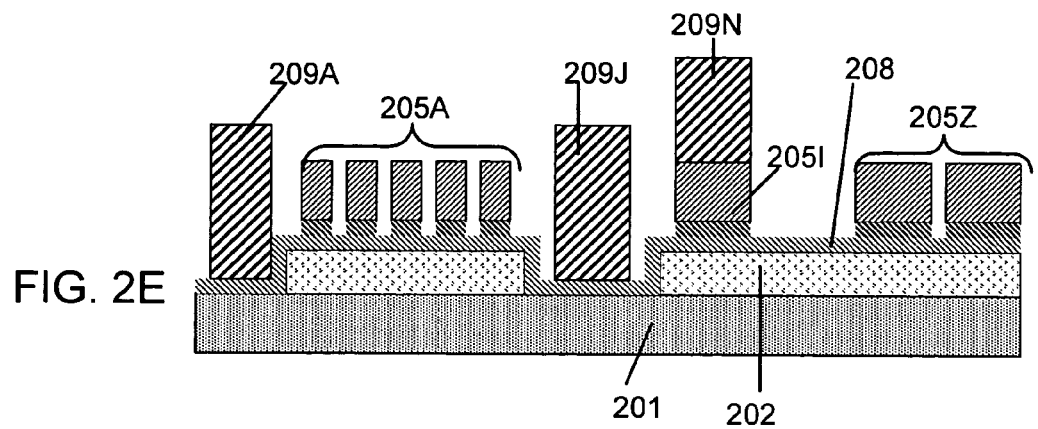

A write head is fabricated in many embodiments of this invention starting with a structure 200 of the type illustrated in FIG. 2A. Note that the specific manner in which structure 200 is formed and subsequently processed is a critical aspect of the current invention. Specifically, structure 200 includes a substrate and several layers, including a layer 201 of NiFe which is about 2 microns thick. Layer 201 is similar or identical to layer 101 described above in reference to FIG. 1A. On layer 201 is formed a gap layer 202 again similar to gap layer 102 also described above Unlike the process of FIGS. 1A–1H, in accordance with the invention, via holes (such as hole 206) are formed in gap layer 202 immediately after the gap layer has been formed, and prior to formation of seed layer 203 (FIG. 2B) that is used to plate the coils. Note that via hole 206 is formed by a lift-off process. Since Alumina lift off process is well known in the industry, it is not discussed any further Hence, seed layer 203 (FIG. 2B) is formed in an inverse order relative to via hole formation, as compared to the prior art. For this reason, as seen in FIG. 2B, seed layer 203 is also formed in via hole 206, which was not the case in the prior art. Gap layer patterning prior to plating eliminates the apply, bake, expose and develop steps of photo lithography that were previously required (as per FIG. 1A) in the prior art.

The just-described patterning of gap layer 202 allows the formation of the two seed layers 208 and 203 in the following order. Specifically, a seed layer 208 that is to be eventually used in forming vias by plating is first formed all over the wafer (as noted above, this seed layer is also formed in the via hole 206). Then another seed layer 203 that is to be used in plating of coils is next formed directly on seed layer 208. Hence, seed layer 208 is not used at this stage.

Both seed layers 203 and 208 may be formed in a single operation, in a vacuum deposition chamber, using two different targets, e.g. a NiFe target for seed layer 208 (for via plating) followed by a copper target for seed layer 203 (for coil plating). Note that thickness of seed layer 203 in the process of FIGS. 2A–2G is less than (e.g. ~30–50% less than) a corresponding thickness of seed layer 103 of the prior process because it is being formed directly on another seed layer 208. After formation of seed layers 208 and 203, a photo and etch process is used to open row/column boxes and alignment marks for a photo and plating to form coils 205A–205Z as discussed next.

Note that the two seed layers 208 and 203 are used in an order inverse of their formation. Specifically, the second-formed seed layer 203 (which is the topmost layer) is used in plating to form coils 205A–205Z (e.g. of copper) for the write head. Then any remainder of the second seed layer 203 is etched away in the unplated regions, resulting in the structure of FIG. 2D. Note that seed layer 203 is etched only in some embodiments, so that the underlying seed layer 208 is of the same material as a via 209J that is to be formed thereon (as discussed below in reference to FIG. 2E). However, alternative embodiments omit etching of seed layer 203 in which case via 209J is formed directly thereon (i.e. on seed layer 203) because layer 203 being a metal supports the plating of via 209J.

Note that etching of second-formed seed layer 203 is quicker in the process of FIGS. 2A–2G than the corresponding etching of seed layer 103 due to the smaller thickness needed by combination of seed layers in FIG. 2B. The specific etch process is isotropic etch, and the duration of etching is carefully controlled to remove only the second-formed seed layer 203 (and not the first-formed seed layer 208 which is discussed below).

Note that at this stage there is no need to open via holes in the gap layer 202 because as noted above, the via holes have been already opened. Moreover, there is no need to remove seed layer 203 from the region where via holes are formed, because seed layer 208 is already formed therein and is ready for use. Therefore, immediately after coil formation by etching layer 203, the first-formed seed layer 208 is next used, for plating to form vias 209A–209J (e.g. of NiFe) in the via holes of gap layer 202. Note that an additional via 209N is also formed, but first-formed seed layer 208 is not used for this via because this via is formed directly on trace 205I.

Applicants have found that a normal plating process used for nickel iron vias 209A–209J is able to form via 209N on the copper trace 205I which was formed by plating. This is an unexpected result because it eliminates the need for a nickel iron seed layer to be formed on copper trace 205I. Note that any metal seed deposition process which is a standard vacuum process may be used, and metal will be plated as long as there is a layer of metal seed that is conductive (i.e. as long as there's a conductive path).

Figure 2F:
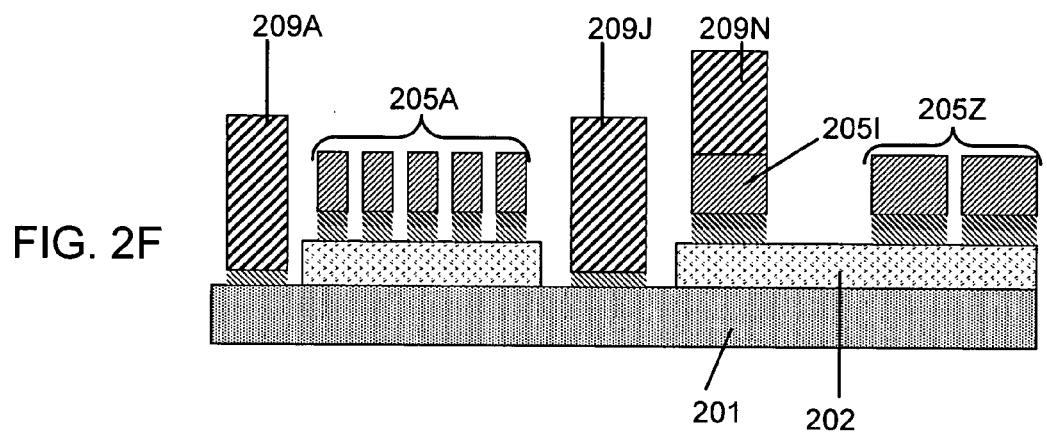
Figure 2G:
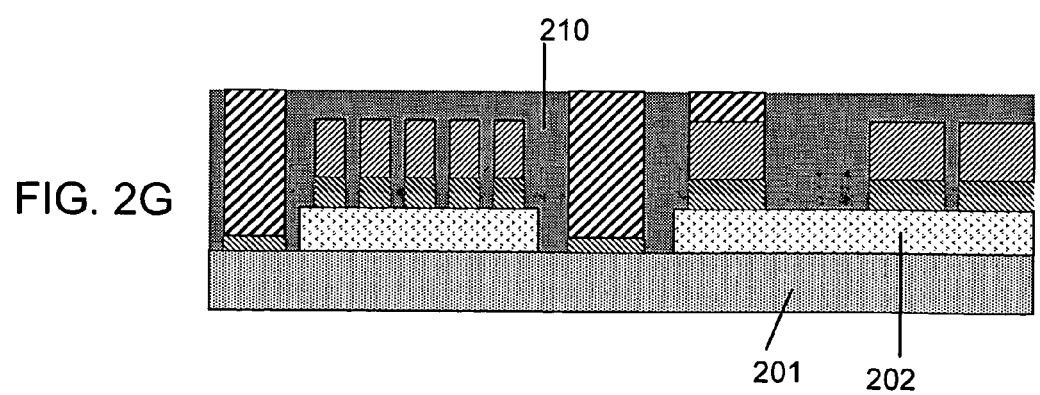

After formation of vias 209A–209N, the remainder of the first-formed seed layer 208 is etched away in regions that are not plated, to obtain the structure shown in FIG. 2F. Next, as shown in FIG. 2G, a single insulation layer 210 is formed, to insulate and protect all plated elements 205A–205Z and 209A–209N, regardless of whether they are formed by use of the first seed layer or the second seed layer.

Note that at each stage illustrated in FIGS. 2A–2G, the alignment marks (which are not shown) located right at the substrate (far below layer 201 of FIGS. 2A–2G, and underneath other layers that are themselves beneath layer 201) are visible to any tool through all these layers, because these layers are transparent. For this reason, there is no etching done in the process of FIGS. 2A–2G to open up the marks.

Note that during a seed deposition process called "full film" in the vacuum deposition chamber wherein the layers 203 and 208 are formed, the alignment marks are covered by a blanket deposition. For this reason, immediately after the seed layers are formed, a sputter and etch process is used to open up the alignment marks, after formation of the structure shown in FIGS. 2D and 2E.

Although the present invention is illustrated in connection with specific embodiments for instructional purposes, the present invention is not limited thereto. Various adaptations and modifications may be made without departing from the scope of the invention. For example, although two or more seed layers (such as layers 203 and 208 shown in FIGS. 2A–2G) are in contact with one another in the illustrated embodiment, in other embodiments one or more additional layers are present therebetween. Moreover, although two metal layers are illustrated in contact with one another in a certain orientation that is used in several embodiments of the invention, other metals or other orientation may be used in other embodiments. Specifically, plating occurs as long as there is a conductive path and hence two metals may be plated in any order relative to one another. Many embodiments deposit NiFe seed first, and then Copper. This is because the metal seed material underneath the plating is not being removed. Therefore these embodiments deposit NiFe seed first, then Copper so that the resulting structure has NiFe with Copper on top, rather than NiFe, then Copper seed, then NiFe seed, then Copper plating Therefore, the spirit and scope of the appended claims should not be limited to the foregoing description.

What is claimed is:

1. A method of fabricating a magnetic write head in a wafer, the method comprising:
   forming a first seed layer;
   forming a second seed layer subsequent to formation of the first seed layer and prior to usage of the first seed layer;
   using the second seed layer, by plating thereon to form at least a plurality of coils, the plurality of coils comprising a metal included in the second seed layer;
   etching the second seed layer, subsequent to plating, to expose the first seed layer, wherein the plurality of coils are etched during etching of the second seed layer;
   using the first seed layer, subsequent to etching of the second seed layer, in plating thereon to form vias.

2. The method of claim 1 wherein:
   the metal included in the second seed layer is copper;
   the first seed layer comprises nickel and iron; and
   the traces comprise nickel and iron.

3. The method of claim 2 wherein:
   during plating on the second seed layer, said write head is formed of copper;
   during etching of the second seed layer, the write head is etched; and
   during plating on the first seed layer, a contact is plated on to the write head.

4. The method of claim 1 further comprising:
   etching the first seed layer, subsequent to using the first seed layer; and
   spinning a single resist in areas between all coils and vias.

5. The method of claim 4 further comprising:
   chemical mechanical polishing subsequent to spinning of the single resist.

6. The method of claim 1 wherein:
   the second seed layer is formed directly on the first seed layer.

7. The method of claim 6 wherein:
   the second seed layer and the first seed layer are formed in a process chamber for vacuum deposition using as targets nickel-iron and copper.

8. The method of claim 1 further comprising:
   forming a via hole in an insulation layer located directly underneath the first seed layer, prior to forming the first seed layer;
   wherein the first seed layer is formed on all regions of the wafer, including being formed in the via hole; and
   wherein the second seed layer is also formed on all regions of the wafer, including being formed in the via hole.

9. A method of fabricating a device in a wafer, the method comprising:
   forming a first layer;
   forming a second layer subsequent to forming the first layer and prior to usage of the first layer;
   using the second layer;
   etching the second layer subsequent to using, to expose the first layer;
   using the first layer subsequent to etching of the second layer; and
   etching the first layer subsequent to using the first layer.

10. The method of claim 9 wherein a structure resulting from said formings, said usings and said etchings has a plurality of openings, and the method further comprising:
    spinning a single resist in all openings of said structure.

11. The method of claim 10 further comprising:
    chemical mechanical polishing subsequent to spinning of the single resist.

12. The method of claim 9 wherein:
    the second layer is formed directly on the first layer.

13. The method of claim 9 wherein:
    the second layer and the first layer are formed in a process chamber for vacuum deposition.

14. The method of claim 9 further comprising:
    forming a via hole in an insulation layer located directly underneath the first layer, prior to forming the first layer;
    wherein the first layer is formed on all regions of the wafer, including being formed in the via hole; and
    wherein the second layer is also formed on all regions of the wafer, including being formed in the via hole.

* * * * *